United States Patent [19]

Kulka

[11] Patent Number: 4,722,032

[45] Date of Patent: Jan. 26, 1988

[54] VEHICLE TAIL LAMP ASSEMBLY

[75] Inventor: Frederick C. Kulka, Fraser, Mich.

[73] Assignee: General Motors Corporation, Detroit, Mich.

[21] Appl. No.: 25,598

[22] Filed: Mar. 13, 1987

[51] Int. Cl.⁴ .............................................. B60Q 1/26
[52] U.S. Cl. .................................... 362/80; 362/287; 362/365; 362/427
[58] Field of Search ................ 362/80, 287, 365, 368, 362/427

[56] References Cited

U.S. PATENT DOCUMENTS

| 2,606,772 | 8/1952 | Mead et al. | 362/80 |
| 2,812,955 | 11/1957 | Urban et al. | 362/80 |
| 3,109,159 | 10/1963 | Jordan et al. | 362/80 |
| 4,471,411 | 9/1984 | Graham et al. | 362/80 |
| 4,488,206 | 12/1984 | Mizusawa | 362/226 |
| 4,621,307 | 11/1986 | Weber | 362/80 |

Primary Examiner—E. Rollins Cross
Attorney, Agent, or Firm—Edward J. Biskup

[57] ABSTRACT

A tail lamp assembly hinged to a support housing secured to the rear of a vehicle and adapted to be pivoted outwardly from the support housing by spring means carried by the support housing.

3 Claims, 3 Drawing Figures

U.S. Patent  Jan. 26, 1988  4,722,032
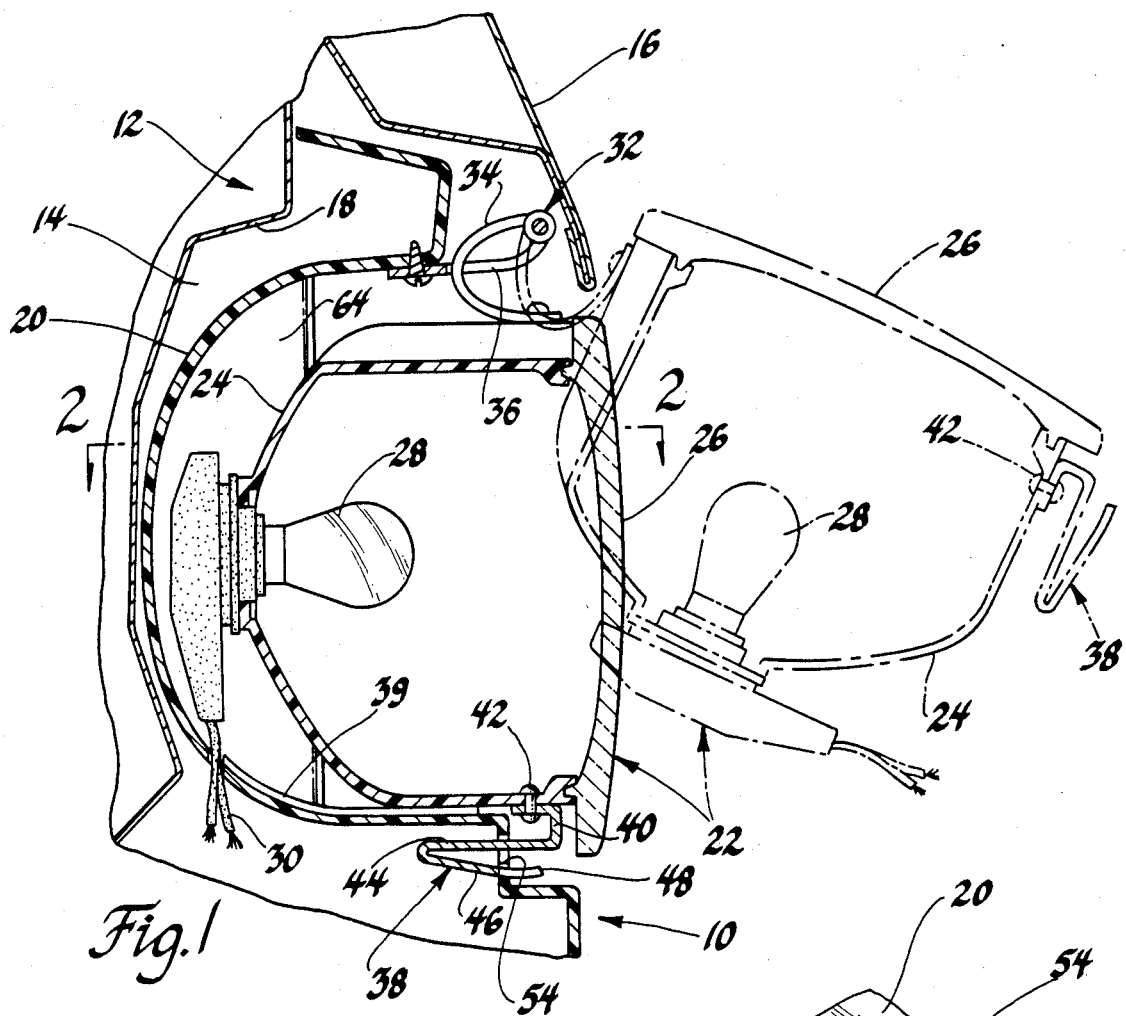
Fig.1
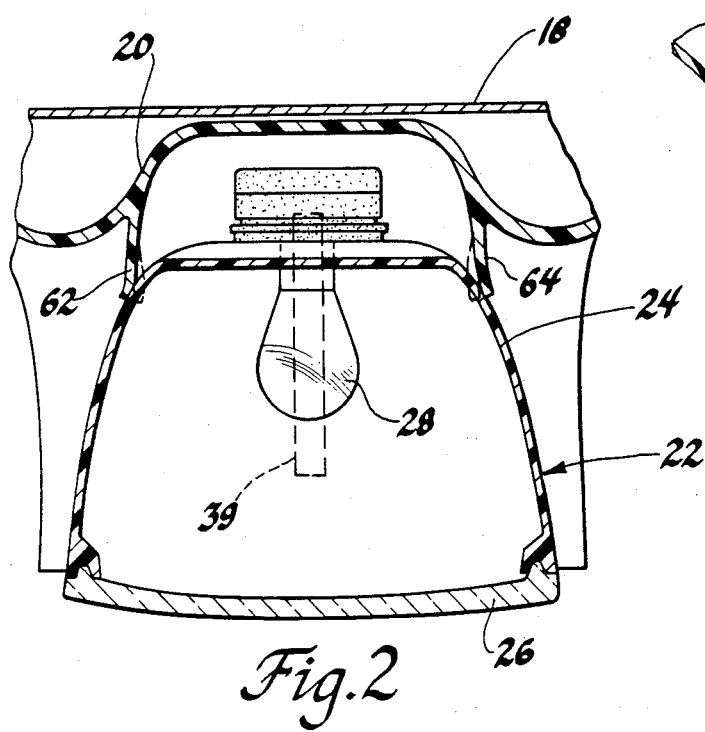
Fig.2
Fig.3

VEHICLE TAIL LAMP ASSEMBLY

This invention relates to a tail lamp assembly for a vehicle and more particularly concerns a tail lamp mounted to a vehicle through a hinged connection so as to allow the tail lamp to be pivoted outwardly from the vehicle body for servicing.

A hinged tail lamp assembly can be seen in U.S. Pat. No. 4,471,411 which issued on Sept. 11, 1984, in the name of Graham et al and is assigned to the assignee of this invention. In the U.S. Pat. No. 4,471,411, the tail lamp structure fits within a finishing panel to which it is hinged at its upper end and includes integral bosses which extend through the panel and are held thereto by screw members.

This invention concerns a tail lamp assembly that is similar to the assembly seen in the above-mentioned patent but differs therefrom in that spring means are provided which serve to bias the tail lamp structure upwardly at all times. This assures that the tail lamp is firmly positioned within the support housing and remains in the desired position. More specifically, the tail lamp assembly made in accordance with the present invention includes a support housing adapted to be attached to the rear of the vehicle. A tail lamp structure, including a reflector body having a lens, is located within the support housing and is connected thereto by hinge means which allow the tail lamp structure to be moved between a closed position wherein the tail lamp structure is located within the support housing and an open position wherein the tail lamp structure is swung outwardly relative to the support housing to provide access to the reflector for servicing. Spring means are formed with the support housing so as to contact the rear of the reflector and thereby bias the tail lamp structure outwardly towards the open position. In addition, manually releasable fastener means are located between the tail lamp structure and the support housing for maintaining the tail lamp structure in the closed position against the bias of the spring means.

The objects of the present invention are to provide a new and improved tail lamp assembly which is pivotally supported by a housing and is normally biased outwardly when located within the housing; to provide a new and improved tail lamp assembly which is positioned within a support housing secured to the rear of a vehicle and is adapted to be pivoted outwardly from the support housing by spring means carried by the support housing; to provide a new and improved tail lamp assembly that is hinged to a support housing formed with ribs which apply an outwardly biasing force to the tail lamp assembly urging the latter to the open position but maintained in a closed positioned by a releasable fastener; and to provide a new and improved tail lamp assembly that is pivotally supported in a housing attachable to the rear of a vehicle and that is characterized in that the tail lamp structure can be maintained within the support housing by a retainer member so no exposed screws are required on the face of the tail lamp structure.

Other objects and advantages of the present invention will be more apparent from the following detailed description when taken with the drawings in which FIG. 1 is a side elevational sectional view of a tail lamp assembly made in accordance with the present invention and mounted in the rear of a vehicle body;

FIG. 2 is a sectional view taken on line 2—2 of FIG. 3; and

FIG. 3 is a perspective view showing the retainer member incorporated with the tail lamp assembly of FIGS. 1 and 2.

Referring now the drawings and, more particularly, FIGS. 1 and 2 thereof, a tail lamp assembly 10 made in accordance with the present invention is shown located within the rear portion of a vehicle body designated generally by the reference numeral 12. The tail lamp assembly 10 is located within a cavity 14 formed in the vehicle body 12 that is defined by the lower end of a trunk lid 16 and the usual sheet metal end panel 18 of the body 12 which extends transversely of the vehicle. It will be understood that a tail lamp assembly similar to tail lamp assembly 10 would be provided on each side of the rear of the body 12 and that the end panels 18 on both sides of the vehicle are interconnected by a license plate mounting portion (not shown) which may be formed integrally therewith or separately therefrom.

The tail lamp assembly 10 includes a support housing 20 which can be made of a plastic material and be fastened with screws or the like directly to the end panel 18 of the vehicle body 12. As best seen in FIG. 1, a tail lamp structure 22 is located within the support housing 20 and comprises the usual reflector body 24, the open end of which is closed by a lens 26. A replaceable bulb 28 is carried by the reflector body 24 and is connected through conventional wires 30 to the usual wiring harness (not shown) of the vehicle. A hinge 32 consisting of relatively pivotal arms 34 and 36 serves to connect the upper portion of the reflector body 24 to the upper portion of the support housing 20. The lower portion of the reflector body 24 is releasably connected to the lower portion of the support housing 20 by a retainer member 38 so as to permit the tail lamp structure 22 to be movable through the hinge 32 about a horizontal axis from the closed full-line position of FIG. 1 to the open position shown in phantom lines. Also, it will be noted that the lower portion of the reflector body 24, when in the closed position of FIG. 1, is biased by the hinge 32 into engagement with a rib 39 integrally formed with the lower portion of the support housing 20.

The retainer member 38 takes the form of a clip made of spring steel that includes a foot 40 rigidly attached to the reflector by a rivet 42. The foot 40 is integrally connected to a pair of vertically spaced interconnected legs 44 and 46, the latter of which terminate with a tongue 48 that is movable towards the leg 44. As should be apparent, and as seen in FIG. 3, the retainer member 38 is adapted to be received within a T-slot 50 formed in the lower portion of the support housing 20 during which time the leg 46 is compressed towards the leg 44 by the horizontal walls 52 and 54 of the slot. After the retainer member 38 moves into the T-slot 50 beyond the shoulders 56 and 58 of the leg 46, the leg 46 drops into the notch portion 60 of the T-slot 50 and then resumes its normal unflexed position so that the shoulders 56 and 58 abut the support housing portions below the walls 52 and 54. As a result the lower portion of the tail lamp structure 22 is locked to the support housing 20. It will be noted that the back wall of the support housing 20 includes a pair of vertically extending, laterally spaced, and integrally formed flexible ribs 62 and 64 as seen in FIGS. 1 and 2. The ribs 62 and 64 are located directly to the rear of the tail lamp structure 22 so when the latter is in the closed position of FIGS. 1 and 2, the rear of the reflector body 24 presses against the ribs 62 and 64 and causes each of them to be flexed laterally outwardly from the phantom line position to the full line position as seen in FIG. 2. As a result, the ribs 62 and 64 create a biasing or spring force urging the tail lamp structure 22 towards the open position. As should be apparent, the biasing force of the ribs 62 and 64 is resisted by the shoulders 56 and 58 of the retainer member 38 engaging the inner surfaces of the lower portion of the support housing 20 as aforedescribed. When one desires to service the tail lamp assembly 10, a screw driver can be inserted below the tongue 48, as seen in FIG. 1, and the tongue 48 is raised upwardly until the shoulders 56 and 58 are above the walls 52 and 54. At such time, the ribs 62 and 64 will cause the tail lamp structure 22 to move outwardly from the full line position of FIG. 1 towards the phantom line position so as to allow the servicing of the tail lamp structure 22.

Various changes and modifications can be made in this construction without departing from the spirit and scope of the invention. Such changes and modifications are contemplated by the inventor and he does not wish to be limited except by the scope of the appended claims.

The embodiments of the invention in which an exclusive property or privilege is claimed are defined as follows:

1. A tail lamp assembly for a vehicle comprising a support housing adapted to be attached to the rear of said vehicle,
   a tail lamp structure including a reflector body having a lens connected thereto,
   hinge means connecting said tail lamp structure to said support housing so as to allow said tail lamp structure to be moved between a closed position wherein said tail lamp structure is located within said support housing and an open position wherein said tail lamp structure is swung outwardly relative to said support housing to provide access to said reflector for servicing,
   spring means formed with said support housing so as to contact the rear of said reflector body and bias the tail lamp structure outwardly towards said open position when said tail lamp structure is in the closed position,
   and manually releaseable fastener means located between said tail lamp structure and said support housing for maintaining said tail lamp structure in said closed position against the bias of said spring means.

2. A tail lamp assembly for a vehicle comprising a support housing adapted to be attached to the rear of said vehicle,
   a tail lamp structure including a reflector body having a lens connected thereto,
   hinge means connecting the upper portion of said tail lamp structure to said support housing so as to allow said tail lamp structure to be moved between a closed position wherein said tail lamp structure is located within said support housing and an open position wherein said tail lamp structure is swung outwardly relative to said support housing to provide access to said reflector for servicing,
   spring means integrally formed with said support housing so as to contact the rear of said reflector body and bias the tail lamp structure outwardly towards said open position when said tail lamp structure is in the closed position,
   and manually releaseable fastener means located between the lower portion of said tail lamp structure and said support housing for maintaining said tail lamp structure in said closed position against the bias of said spring means.

3. A tail lamp assembly for a vehicle comprising a support housing adapted to be attached to the rear of said vehicle,
   a tail lamp structure including a reflector body having a lens connected thereto,
   hinge means connecting the upper portion of said tail lamp structure to said support housing so as to allow said tail lamp structure to be moved between a closed position wherein said tail lamp structure is located within said support housing and an open position wherein said tail lamp structure is swung outwardly relative to said support housing to provide access to said reflector for servicing,
   a pair of flexible ribs integrally formed with said support housing so as to contact the rear of said reflector and serve as a spring means for biasing the tail lamp structure outwardly towards said open position when said tail lamp structure is in the closed position,
   and manually releaseable fastener means in the form of a clip located between the lower portion of said tail lamp structure and said support housing for maintaining said tail lamp structure in said closed position against the bias of said pair of ribs.

* * * * *